US009667392B2

(12) United States Patent
Pajukoski et al.

(10) Patent No.: US 9,667,392 B2
(45) Date of Patent: May 30, 2017

(54) APPARATUS AND METHOD FOR ALLOCATING THE REFERENCE SYMBOLS IN ORDER TO REDUCE THE LATENCY OF THE LTE SYSTEM (75) Inventors: Kari Pekka Pajukoski, Oulu (FI); Bernhard Raaf, Neuried (DE); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 200 days.

(21) Appl. No.: 14/126,119

(22) PCT Filed: Jun. 14, 2011

(86) PCT No.: PCT/EP2011/059835
§ 371 (c)(1),
(2), (4) Date: Dec. 13, 2013

(87) PCT Pub. No.: WO2012/171553
PCT Pub. Date: Dec. 20, 2012

(65) Prior Publication Data
US 2014/0119314 A1    May 1, 2014

(51) Int. Cl.
*H04W 72/04*    (2009.01)
*H04L 5/00*    (2006.01)
*H04L 1/18*    (2006.01)
*H04L 25/02*    (2006.01)

(52) U.S. Cl.
CPC .......... *H04L 5/0037* (2013.01); *H04L 5/0051* (2013.01); *H04L 1/1854* (2013.01); *H04L 5/0044* (2013.01); *H04L 5/0094* (2013.01); *H04L 25/0204* (2013.01); *H04L 25/0224* (2013.01)

(58) Field of Classification Search
CPC ... H04L 5/0037; H04L 5/0051; H04L 5/0044; H04L 5/0094; H04L 25/0204; H04L 1/1854; H04L 25/0224
See application file for complete search history.

(56) References Cited

U.S. PATENT DOCUMENTS

| 6,990,092 | B1* | 1/2006 | Siala ............................ 370/347 |
| 2009/0109908 | A1* | 4/2009 | Bertrand et al. ............. 370/329 |
| 2009/0204863 | A1* | 8/2009 | Kim ..................... H04L 1/0004 714/748 |
| 2010/0080187 | A1* | 4/2010 | Papasakellariou .... H04L 5/0051 370/329 |

(Continued)

FOREIGN PATENT DOCUMENTS

WO    WO 2006/124042 A1    11/2006
WO    WO 2011/050856 A1    5/2011

OTHER PUBLICATIONS

Demodulation Reference Signal Design and Channel Estimation for LTE-Advanced Uplink; Hou et al. Apr. 11, 2011.*

(Continued)

*Primary Examiner* — Jay P Patel
(74) *Attorney, Agent, or Firm* — Harrington & Smith (57) ABSTRACT Apparatus and method for communication are provided. In the proposed solution resources for transmission of user data and dedicated reference signals for demodulating a signal are allocated separately. The minimum scheduling units in frequency and time in the resources reserved for user data transmission do not include any reference signals 20 Claims, 7 Drawing Sheets (56) References Cited

U.S. PATENT DOCUMENTS

| | | | |
|---|---|---|---|
| 2011/0194516 A1* | 8/2011 | Aiba | H04L 1/0026 370/329 |
| 2011/0199944 A1* | 8/2011 | Chen et al. | 370/280 |
| 2011/0212743 A1* | 9/2011 | Yokomakura et al. | 455/509 |
| 2011/0294529 A1* | 12/2011 | Luo et al. | 455/509 |
| 2012/0026964 A1* | 2/2012 | Koivisto et al. | 370/329 |
| 2012/0202558 A1* | 8/2012 | Hedberg | H04L 5/0058 455/550.1 |
| 2012/0281654 A1* | 11/2012 | Aiba | H04L 5/0007 370/329 |
| 2012/0294254 A1* | 11/2012 | Behravan et al. | 370/329 |
| 2013/0039202 A1* | 2/2013 | Feuersanger | H04L 5/001 370/252 |
| 2013/0051342 A1* | 2/2013 | Aiba | H04L 1/1893 370/329 |
| 2013/0343316 A1* | 12/2013 | Pajukoski | H04L 5/0048 370/329 |

OTHER PUBLICATIONS

3GPP TSG RAN WG1 Meeting #60, San Francisco, US, Feb. 22-26, 2010, R1-101438, "Channel sounding enhancements for LTE-Advanced uplink", Nokia Siemens Network, Nokia, 3 pgs.

3GPP TSG RAN WG1 Meeting #64, Taipei, Feb. 21-25, 2011, R1-110714, "Further discussion on triggering of aperiodic SRS via DL grants", CATT, 3 pgs.

3GPP TS 36.211 V10.1.0 (Mar. 2011), "$3^{rd}$ Generation Partnership Project; Technical Specification Group Radio Access Network; Evolved Universal Terrestrial Radio Access (E-UTRA); Physical Channels and Modulation ( Release 10)", 103 pgs.

3GPP TS 36.213 V10.1.0 (Mar. 2011), "$3^{rd}$ Generation Partnership Project, Technical Specification Group radio Access Network; Evolved Universal Terrestrial Radio Access (E-UTRA); Physical layer procedures (Release 10)", 115 pgs.

* cited by examiner

APPARATUS AND METHOD FOR ALLOCATING THE REFERENCE SYMBOLS IN ORDER TO REDUCE THE LATENCY OF THE LTE SYSTEM

FIELD

The exemplary and non-limiting embodiments of the invention relate generally to wireless communication networks and, more particularly, to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE). An improved version of the Long Term Evolution radio access system is called LTE-Advanced (LTE-A). The LTE and LTE-A are designed to support various services, such as high-speed data. Another developed system is so called Beyond 4G (B4G) radio system which is assumed to be operational in the future.

In future, mobile broadband traffic is expected to increase significantly. A need for systems supporting very high data rates is clear. The design of high data rate communication faces many problems. One of the problems is latency which is due to processing delays in transceivers, for example.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor and at least one memory including a computer program code, the at least one memory and the computer program code configured to, with the at least one processor, cause the apparatus at least to: allocate separately resources for transmission of user data and dedicated reference signals for demodulating a signal, wherein minimum scheduling units in frequency and time in the resources reserved for user data transmission do not comprise any reference signals.

According to another aspect of the present invention, there is provided a method comprising: allocating separately resources for transmission of user data and dedicated reference signals for demodulating a signal, wherein minimum scheduling units in frequency and time in the resources reserved for user data transmission do not comprise any reference signals.

According to an aspect of the present invention, there is provided an apparatus, comprising: at least one processor and at least one memory including a computer program code, the at least one memory and the computer program code configured to, with the at least one processor, cause the apparatus at least to: control the reception of information on separately allocated resources for transmission of user data and dedicated reference signals for demodulating a signal, wherein minimum scheduling units in frequency and time in the resources reserved for user data transmission do not comprise any reference signals, and control the transmission of user data and dedicated reference signals using the allocated resources.

According to another aspect of the present invention, there is provided a method comprising: controlling the reception of information on separately allocated resources for transmission of user data and dedicated reference signals for demodulating a signal, wherein minimum scheduling units in frequency and time in the resources reserved for user data transmission do not comprise any reference signals, and controlling the transmission of user data and dedicated reference signals using the allocated resources.

According to another aspect of the present invention, there is provided an apparatus comprising: means for allocating separately resources for transmission of user data and dedicated reference signals for demodulating a signal, wherein minimum scheduling units in frequency and time in the resources reserved for user data transmission do not comprise any reference signals.

According to another aspect of the present invention, there is provided an apparatus comprising: means for controlling the reception of information on separately allocated resources for transmission of user data and dedicated reference signals for demodulating a signal, wherein minimum scheduling units in frequency and time in the resources reserved for user data transmission do not comprise any reference signals, and means for controlling the transmission of user data and dedicated reference signals using the allocated resources.

According to an aspect of the present invention, there is provided a computer program embodied on a distribution medium, comprising program instructions which, when loaded into an electronic apparatus, control the apparatus to: allocate separately resources for transmission of user data and dedicated reference signals for demodulating a signal, wherein minimum scheduling units in frequency and time in the resources reserved for user data transmission do not comprise any reference signals.

According to an aspect of the present invention, there is provided a computer program embodied on a distribution medium, comprising program instructions which, when loaded into an electronic apparatus, control the apparatus to: control the reception of information on separately allocated resources for transmission of user data and dedicated reference signals for demodulating a signal, wherein minimum scheduling units in frequency and time in the resources reserved for user data transmission do not comprise any reference signals, and control the transmission of user data and dedicated reference signals using the allocated resources.

LIST OF DRAWINGS

Embodiments of the present invention are described below, by way of example only, with reference to the accompanying drawings, in which.

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any network element, node, base station, relay node, server, corresponding component, and/or to any communication system or any combination of different communication systems that support required functionalities. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Figure 1:
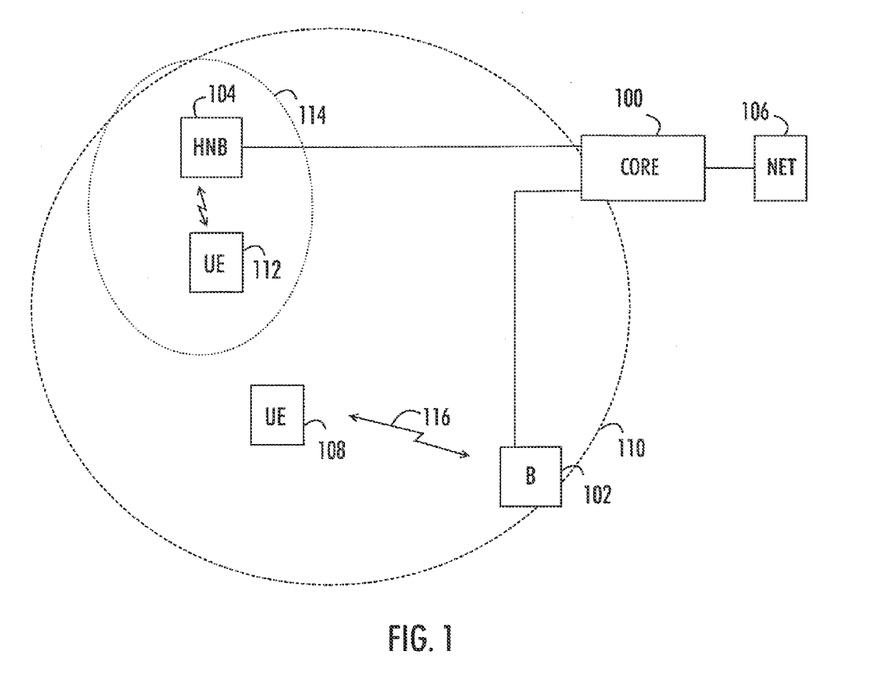
FIG. 1 illustrates an example of a radio system.

With reference to FIG. 1, let us examine an example of a radio system to which embodiments of the invention can be applied.

A general architecture of a communication system is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here.

The exemplary radio system of FIG. 1 comprises a service core 100 of an operator.

In an embodiment, base stations that may also be called eNodeBs (Enhanced node Bs) 102, 104 of the radio system may host the functions for Radio Resource Management: Radio Bearer Control, Radio Admission Control, Connection Mobility Control, Dynamic Resource Allocation (scheduling). The core network 100 is configured to act as a gateway between the network and other parts of communication network such as the Internet 106, for example.

FIG. 1 illustrates user equipment UE 108 located in the service area 110 of the eNodeB 100 and UE 112 located in the service area 114 of the eNodeB 104. User equipment refers to a portable computing device. Such computing devices include wireless mobile communication devices, including, but not limited to, the following types of devices: mobile phone, smartphone, personal digital assistant (PDA), handset, laptop computer. The apparatus may be battery powered. The network may comprise base stations with service areas of different sizes and properties. In the example of FIG. 1, the base station 102 servers a large coverage area and the base station 104 is serving a micro or pico cell. Embodiments of the invention are not limited to any particular cell size or cell type.

In the example situation of FIG. 1, the user equipment 108 has a connection 116 with the eNodeB 102. The connection 116 may be a bidirectional connection related to a speech call or a data service such as browsing the Internet 106.

FIG. 1 only illustrates a simplified example. In practice, the network may include more base stations and more cells may be formed by the base stations. The networks of two or more operators may overlap, the sizes and form of the cells may vary from what is depicted in FIG. 1, etc.

The embodiments are not restricted to the network given above as an example, but a person skilled in the art may apply the solution to other communication networks provided with the necessary properties. For example, the connections between different network elements may be realized with Internet Protocol (IP) connections.

Figure 2:
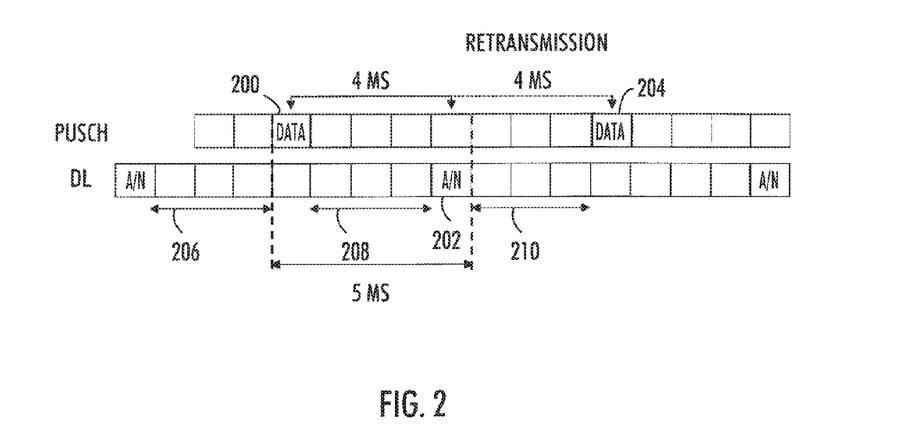
FIG. 2 illustrates an example of latency in LTE based system.

FIG. 2 illustrates an example of latency on the user plane of an LTE based system. The example relates to uplink data transmission on PUSCH (Physical Uplink Shared Channel). In this example, UE transmits data 200 on PUSCH, the base station sends a downlink response 202 requesting retransmission and the UE transmits retransmission packet 204. The length of a subframe 200, 202, 204 is 1 ms. Following latency components (ignoring propagation delay and uplink/downlink frame misalignment) can be seen:

UE processing time 206 prior to PUSCH transmission 3 ms. PUSCH transmission and eNB processing delay 208 prior sending HARQ A/N 202 is 4 ms. The HARQ A/N transmission on PDCCH (Physical Downlink Control Channel) and UE message processing delay 210 is 1 to 4 ms. Thus, total latency of a successful transmission is 5 to 8 ms (ignoring scheduling delay). Each HARQ retransmission increases latency by 8 ms.

Figure 3:
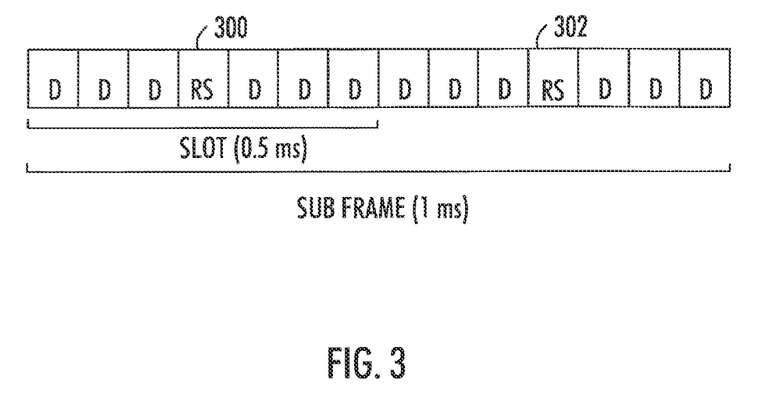
FIG. 3 illustrates an example of sub frame in an LTE based system.

FIG. 3 shows the sub-frame structure used in LTE uplink. Each sub-frame (TTI) comprises two reference symbol blocks 300, 302 which are placed symmetrically within the subframe. One sub-frame equals to minimum scheduling unit in LTE. From latency point of view, it is clear that channel estimation limits the latency because the reference symbols have to be received before moving to symbol level calculations.

In an embodiment, data and reference signal allocation arrangement is optimized for reduced pilot overhead and ultra-low latency. In this arrangement, separate dedicated reference signals are utilized for coherent detection. The reference signals may be antenna port specific.

Figure 4:
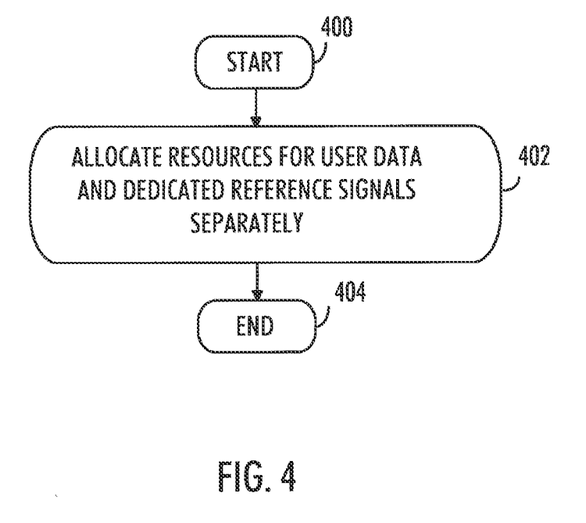
FIGS. 4, 5A, 5B and 5C are flowcharts illustrating examples of embodiments.

FIG. 4 is a flowchart illustrating an example. The process starts in step 400.

In step 402, base station is configured to allocate separately resources for transmission of user data and dedicated reference signals for demodulating a signal, wherein the minimum scheduling units in the resources reserved for user data transmission do not contain any reference signal.

The process ends in step 404.

Thus, data channel resources and reference signal resources are defined and allocated separately. The minimum scheduling units in the resources reserved for user data do not contain any reference signal. Separate reference signals (SRS) may be used for both channel state measurement and coherent detection. In an embodiment, the separate reference signal is configured such that periodicity of the reference signal is larger than the minimum scheduling unit in time (or TTI, transmission time interval).

In an embodiment, separate reference signals are distributed in time/frequency/antenna domain over predetermined spaces considered for data scheduling. They may also contain proper configurability in terms of various parameters such as, frequency allocation, periodicity, transmit power, number of antenna ports, for example.

Figure 5A:
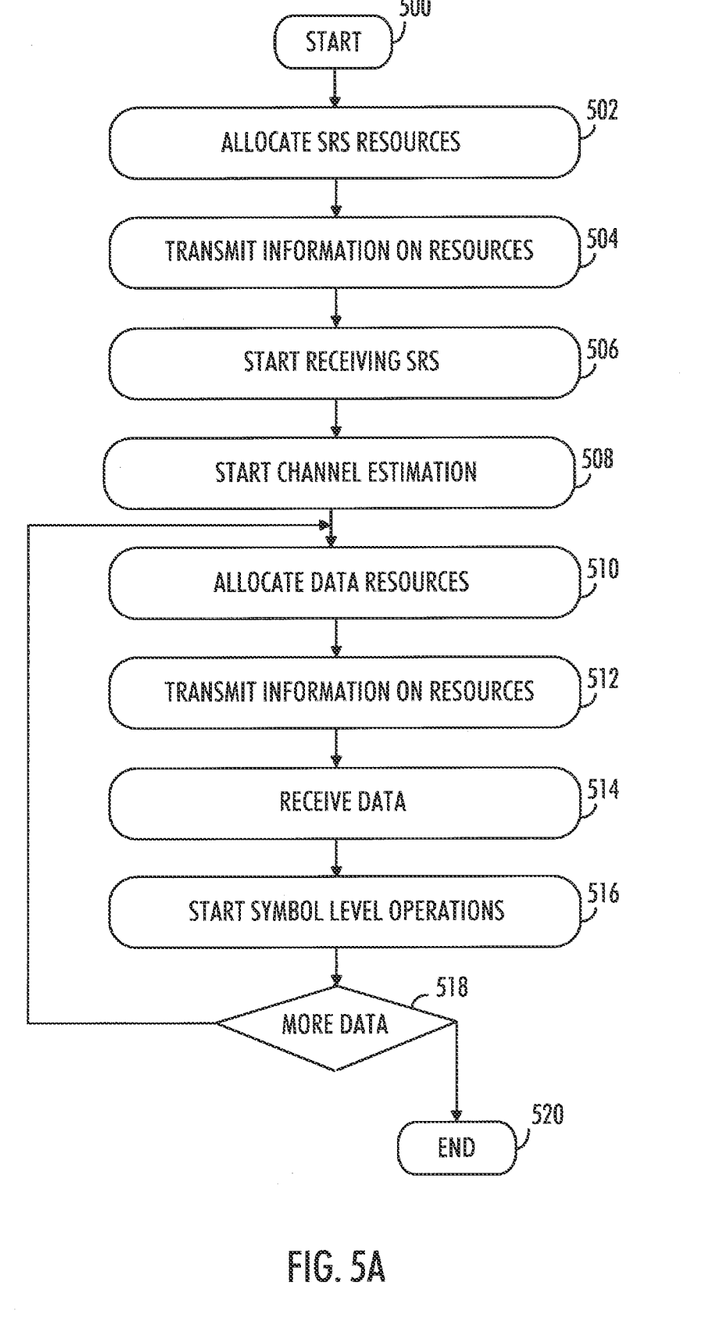

FIG. 5A is a flowchart illustrating an example. The example describes a situation where a base station assigns resources for UE uplink communication. The process starts in step 500.

In step 502, a base station assigns separate reference signal configuration to be applied by the UE. In an embodiment, the periodicity of the dedicated reference signals is greater than minimum scheduling unit in time or the transmission time interval TTI. Information on the location or environment of the UE may be taken into account when selecting the periodicity of the dedicated reference signals. For example, if it is known that the UE is not moving the periodicity may be larger than for a moving vehicle as the channel parameters do not change constantly for a stationary UE.

In step 504, the base station transmits information on the reference signal resource allocation to the UE.

In step 506, the base station starts receiving reference signal transmission from the UE.

In step 508, the base station is configured to start performing channel estimation and equalization weight calculation on the basis of the received reference symbols to be ready for symbol level processing of data to be received. At this phase, the UE has not transmitted any user data, but because the dedicated reference data is transmitted independently from the data the base station is able to perform required operations for channel state measurements and coherent detection prior user data reception. This way the data processing may start with a very short latency right after receiving the data.

In step 510, the base station allocates resources for user data transmission for the UE.

In step 512, the base station transmits information on the user data resource allocation to the UE.

In step 514, the base station starts receiving user data transmission from the UE. The UE started transmission using the allocated resources for user data.

In step 516, the base station is configured to start symbol level operations on the received user data. As channel estimation and coherent detection has already been performed using the separate dedicated resource signal transmitted by the UE it is possible for the base station to initiate the symbol level operations sight after receiving the user data. There is no longer any need to wait for reference data embedded in the user data as in the prior art.

In step 518, if more data is to be communicated, the process continues in step 510 where resources are allocated for data transfer. Else the process ends in step 520.

Figure 5B:
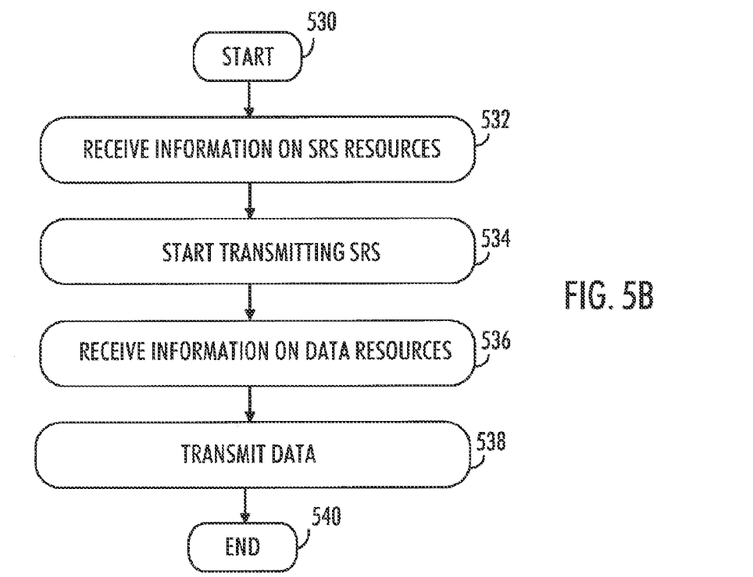

FIG. 5B is a flowchart illustrating an example. The example describes a situation where user equipment receives resources from a base station uplink communication. The process starts in step 530.

In step 532, the user equipment is configured to receive information on resources for separate dedicated reference signal from a base station.

In step 534, the user equipment starts the transmission of dedicated reference signal using the allocated resources although resources for user data transmission have not been allocated yet. On the basis of the reference signal transmission the base station is able to initiate channel estimation and equalization weight calculation.

In step 536, the user equipment receives information on resources allocated for user data transmission.

In step 538, the user equipment initiates the transmission of user data using the allocated resources.

The process ends in 540.

Figure 5C:
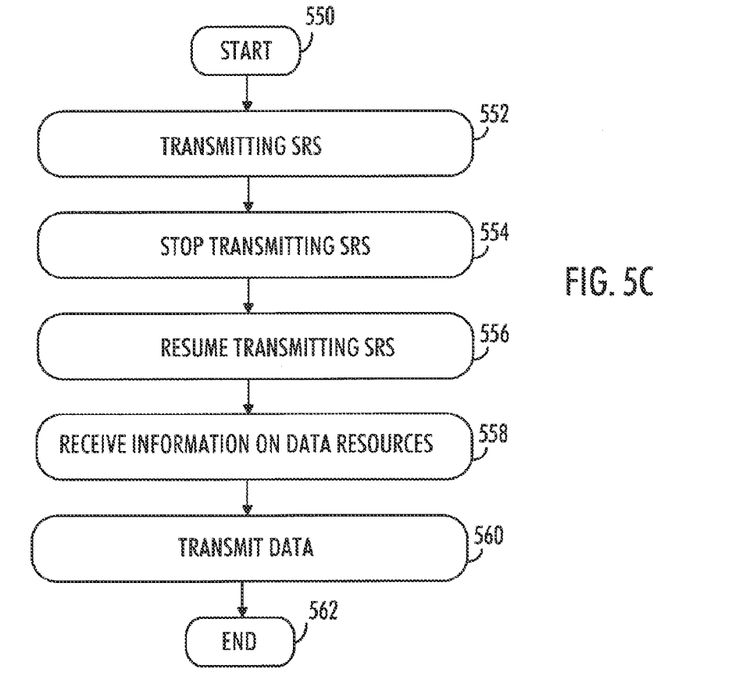

FIG. 5C is a flowchart illustrating an example. The process starts in step 550.

In step 552, the user equipment is transmitting dedicated reference signals.

In step 554, the user equipment ceases temporarily to transmit the dedicated reference signal. The decision may be made by eNodeB and signaled to the UE, by the UE itself or by a timer monitoring data transmission activity. The decision may be based on small activity in UL data transmission. If there is no data to transmit the reference signals are transmitted in vain.

In step 556, the user equipment resumes the transmission of the reference signals. Again, the decision may be made by eNodeB and signaled to the UE or by the UE itself. The transmission may be resumed at the time or just before uplink data transmission starts again.

In this example, the user equipment receives information on resources allocated for user data transmission in step 558.

In step 560, the user equipment initiates the transmission of user data using the allocated resources.

The process ends in 562.

In an embodiment, the applied reference signal structure may be taken into account when selecting HARQ A/N timing. As symbol-level operation may be started right after receiving data in Rx buffer, possible errors in transmission may be detected with a shorter delay. Thus it is possible to dimension the HARQ ACK/NACK timing in a way that shortened processing time is taken into account. In other words, a receiving node (such as eNodeB) may signal HARQ ACK/NACK earlier to the transmitting node (such as UE).

Embodiments of the invention may be implemented by higher layer signaling. For example, a specific "ultra-low-latency" configuration may be defined and applied when needed.

Figure 6A:
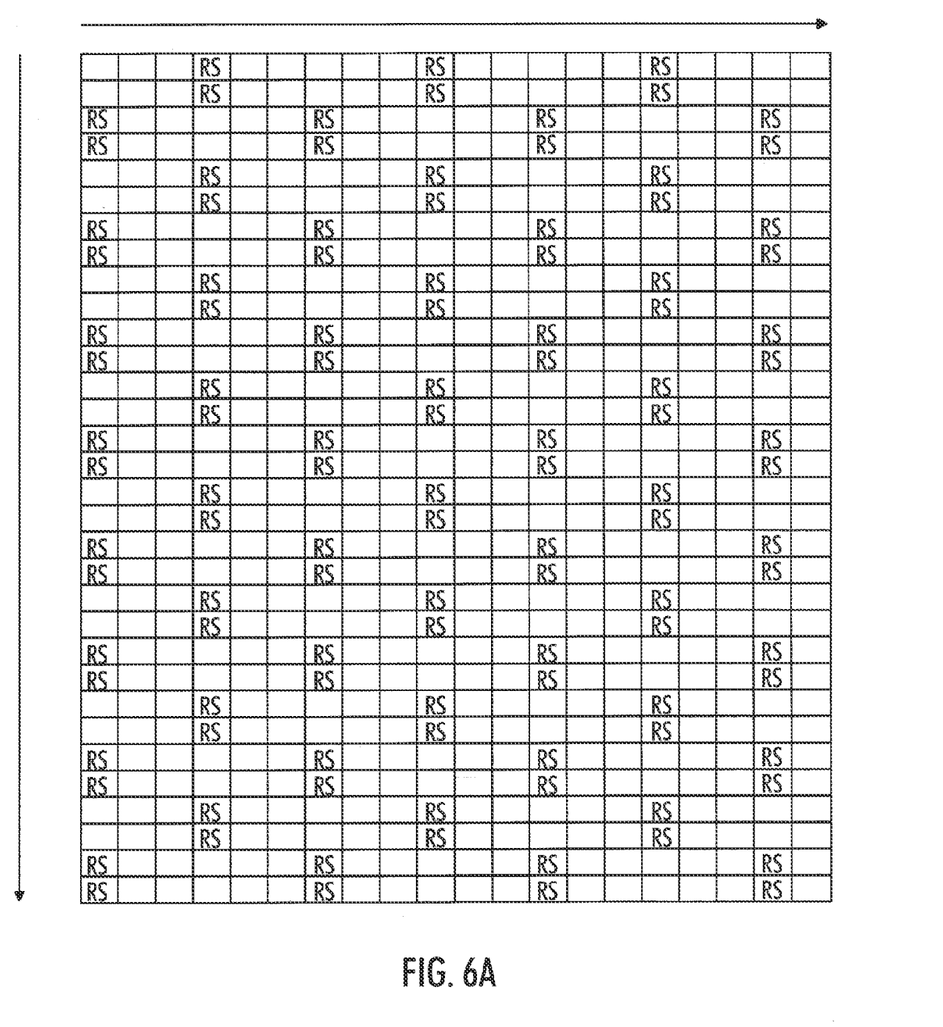
FIGS. 6A and 6B illustrate an example of uplink resource signal allocation.
Figure 6B:
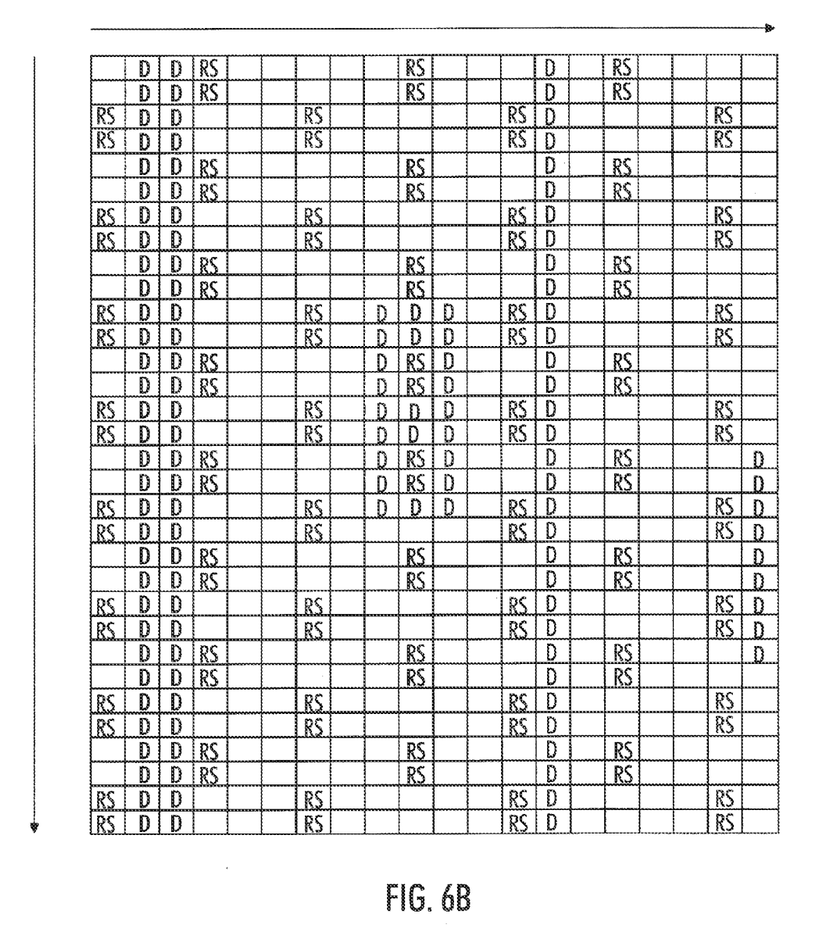

FIGS. 6A and 6B illustrate an example of uplink resource signal allocation of an embodiment. The figures show partial frequency/time resource block where time runs on the x-axis and frequency on the y-axis. One block equals to the smallest scheduling unit. In FIG. 6A, a base station has allocated given resource blocks for the transmission of dedicated reference signal. The blocks are marked with 'RS' in FIG. 6. The user equipment may be configured to initiate dedicated resource signal transmission after receiving information on the resources from the base station. The transmission of the resource signal is independent from the user data transmission.

Next, the base station allocates given number of resource blocks for user data transmission. These blocks are marked with 'D' in FIG. 6B. In an embodiment, the resource allocations for dedicated reference signal and user date do not overlap. By default the frequency/time resource block corresponding to the smallest TTI (transmission time interval) does not contain any reference signal. Only the TTIs allocated for the dedicated reference signal contain the RS. It should be noted that a data transmission can start at any time, even for a TTI that does not contain any RS, because channel estimation is always available at the receiver due to the separate reference signals. This feature avoids a delays when starting transmission, e.g. if a new packet arrives. Furthermore, it allows keeping the RS overhead at reasonable level, also with short TTIs.

It should be noted that FIGS. 6A and 6B are just illustrative, illustrating RS and data allocation for a single user only. The practical realization may vary in many terms, depending on the application. Furthermore, embodiments of the invention are not limited to uplink transmission direction. Downlink realization is likewise possible as one skilled in the art is aware.

Figure 7:
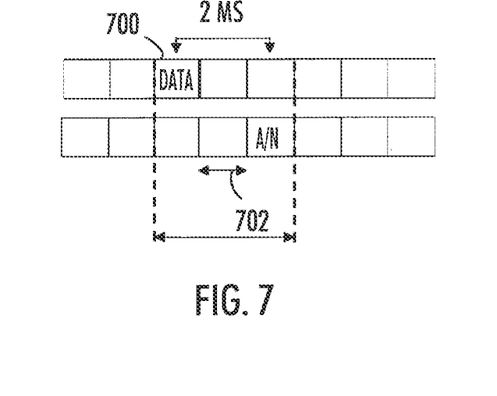
FIG. 7 illustrates an example of latency in an embodiment.

FIG. 7 shows exemplary reduction in latency compared to prior art scheme of FIG. 2 having resource signals in every TTI. In an embodiment of the invention, timing of the reference signal transmission may be optimized to make sure that reference symbols (if present in a TTI) are placed so that they are available (just) in time when symbol level operation on the received data is about to start. Depending on the processing employed this may be just before the first data symbols are received (this is advantageous when the same processing elements are used to process reference symbols and data symbols, because then the processing resources are available just in time for the data) or just with the data symbols (assuming parallel processing elements, this approach may better fit an architecture aiming at high throughput and low delay).

FIG. 7 illustrates how a data packet 700 is sent. As the receiver receiving the packet has calculated channel estimates beforehand on the basis of separate reference signal the processing delay 702 in the receiver is short (in this example 1 ms) compared to the example of FIG. 2 where the corresponding delay was estimated to be 3 ms. The HARQ A/N timing may be set to 2 ms of the reception of the data packet instead of 4 ms as in FIG. 2. All numerical values are for illustrative purposes only.

Figure 8A:
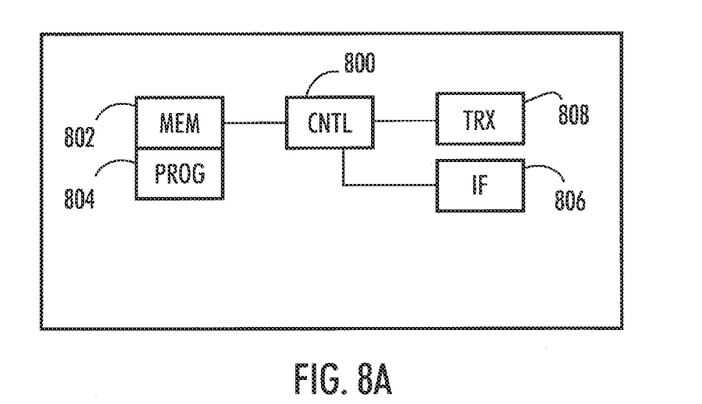
FIGS. 8A and 8B illustrate examples of apparatuses of an embodiment.

FIG. 8A illustrates an embodiment. The figure illustrates a simplified example of an apparatus applying embodiments of the invention. In some embodiments, the apparatus may be an eNodeB of a communications system. In an embodiment, it is a separate network element.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 800 configured to control at least part of the operation of the apparatus.

The apparatus may comprise a memory 802 for storing data. Furthermore the memory may store software 804 executable by the control circuitry 800. The memory may be integrated in the control circuitry.

The software 804 may comprise a computer program comprising program code means adapted to cause the control circuitry 800 of the apparatus to allocate separately resources for transmission of user data and dedicated reference signals for demodulating a signal, wherein the resources reserved for user data transmission do not comprise reference signals, as described above. The software 804 may comprise a computer program comprising program code means adapted to cause the control circuitry 800 of the apparatus to control the reception of user data and dedicated reference signals transmitted by user equipment using separately allocated resources, and utilise the dedicated reference signals for sounding. In addition, control circuitry 800 of the apparatus may be configured to calculate channel estimates and corresponding equalization weights on the basis of the reference signals independently from user data reception.

The apparatus may further comprise interface circuitry 806 operationally connected to the control circuitry 800 and configured to connect the apparatus to other devices and network elements of communication system, for example to core. The interface may provide a wired or wireless connection to the communication network. The apparatus may be in connection with core network elements, base stations and with other respective apparatuses of communication systems.

In an embodiment, the apparatus further comprises a transceiver 808 configured to communicate with user equipment in the service area of the apparatus. The transceiver is operationally connected to the control circuitry 800. It may be connected to an antenna arrangement (not shown). This applies especially if the apparatus is a base station.

Figure 8B:
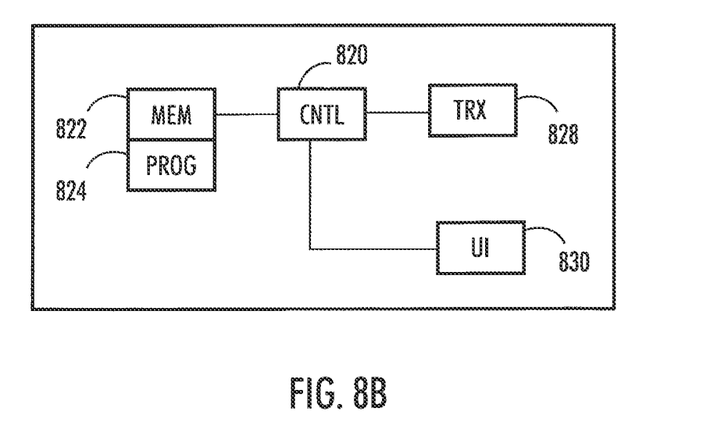

FIG. 8B illustrates another embodiment. The figure illustrates a simplified example of an apparatus applying embodiments of the invention. In some embodiments, the apparatus may be user equipment of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 820 configured to control at least part of the operation of the apparatus.

The apparatus may comprise a memory 822 for storing data. Furthermore the memory may store software 824 executable by the control circuitry 820. The memory may be integrated in the control circuitry. The software may comprise a computer program comprising program code means adapted to cause the control circuitry 820 to control the reception of information on separately allocated resources for transmission of user data and dedicated reference signals for demodulating a signal, wherein the resources reserved for user data transmission do not comprise reference signals, and control the transmission of user data and dedicated reference signals using the allocated resources.

The apparatus further comprises a transceiver 828 configured to communicate with base stations. The transceiver is operationally connected to the control circuitry 820. It may be connected to an antenna arrangement (not shown).

The apparatus may further comprise user interface 830 operationally connected to the control circuitry 820. The user interface may comprise a display, a keyboard or keypad, a microphone and a speaker, for example.

The steps and related functions described above and in the attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured, with the at least one processor, to cause the apparatus at least to:
   assign a reference signal resource allocation and transmit information on the reference signal resource allocation to the user equipment;
   in response to the transmission of the reference signal resource allocation, receive a reference signal transmission from the user equipment;
   carry out operations for symbol level processing on the basis of the received reference signal transmission; carry out resource allocation for user data transmission; and transmit information on the resource allocation for user data transmission to the user equipment;
   in response to the transmission of the information on the resource allocation for user data transmission, receive user data transmission from the user equipment; and carry out the symbol level processing on the received user data.

2. The apparatus of claim 1, wherein the reference signal resource allocation is carried out such that the periodicity of the reference signals is greater than minimum scheduling unit in time.

3. The apparatus of claim 1, wherein the at least one memory and the computer program code are further configured, with the at least one processor, to take the reference signal resource allocation into account when selecting hybrid automatic repeat and request timing.

4. The apparatus of claim 1, wherein the at least one memory and the computer program code are further configured, with the at least one processor, to control the user equipment to cease the reference signal transmission when the user equipment has no data to transmit.

5. The apparatus of claim 1, wherein the reference signal is a sounding reference signal.

6. The apparatus of claim 1, wherein the operations for symbol level processing comprise at least one of:
   channel estimation, equalization weight calculation, channel state measurements and coherent detection.

7. The apparatus of claim 1, wherein the symbol level processing comprises data processing.

8. An apparatus comprising:
   at least one processor and at least one memory including a computer program code, the at least one memory and the computer program code configured, with the at least one processor, to cause the apparatus at least to:
   receive information on reference signal resource allocation;
   transmit a reference signal using the informed reference signal resource allocation;
   receive information on resources allocated for user data transmission, wherein minimum scheduling units in frequency and time do not comprise reference signals; and
   transmit user data using the informed resources allocated for user data transmission, wherein the reference signal is a sounding reference signal.

9. The apparatus of claim 8, wherein the at least one memory and the computer program code are further configured, with the at least one processor, to cease the transmitting of reference signals when there is no data to transmit.

10. A method comprising:
    assigning a reference signal resource allocation and transmit information on the reference signal resource allocation to the user equipment;
    in response to the transmission of the reference signal resource allocation, receiving a reference signal transmission from the user equipment;
    carrying out operations for symbol level processing on the basis of the received reference signal transmission; carrying out resource allocation for user data transmission; and transmitting information on the resource allocation for user data transmission to the user equipment;
    in response to the transmission of the information on the resource allocation for user data transmission, receiving user data transmission from the user equipment; and
    carrying out the symbol level processing on the received user data.

11. The method of claim 10, wherein the reference signal resource allocation is carried out such that the periodicity of the reference signals is greater than minimum scheduling unit in time.

12. The method of claim 10, further comprising:
taking the reference signal resource allocation into account when selecting hybrid automatic repeat and request timing.

13. The method of claim 10, further comprising:
controlling the user equipment to cease the reference signal transmission when the user equipment has no data to transmit.

14. The method of claim 10, wherein the reference signal is a sounding reference signal.

15. The apparatus of claim 10, wherein the operations for symbol level processing comprise at least one of:
channel estimation, equalization weight calculation, channel state measurements and coherent detection.

16. The apparatus of claim 10, wherein the symbol level processing comprises data processing.

17. A method comprising:
receiving information on reference signal resource allocation;
transmitting a reference signal using the informed reference signal resource allocation;
receiving information on resources allocated for user data transmission, wherein minimum scheduling units in frequency and time do not comprise reference signals; and
transmitting user data using the informed resources allocated for user data transmission, wherein the reference signal is a sounding reference signal.

18. The method of claim 17, further comprising:
ceasing the transmitting of reference signals when there is no data to transmit.

19. A computer program product comprising a non-transitory computer-readable storage medium bearing computer program code embodied therein for use with a computer, the computer program code comprising code for performing:

assigning a reference signal resource allocation and transmit information on the reference signal resource allocation to the user equipment;
in response to the transmission of the reference signal resource allocation, receiving a reference signal transmission from the user equipment;
carrying out operations for symbol level processing on the basis of the received reference signal transmission; carrying out resource allocation for user data transmission; and transmitting information on the resource allocation for user data transmission to the user equipment;
in response to the transmission of the information on the resource allocation for user data transmission, receiving user data transmission from the user equipment; and
carrying out the symbol level processing on the received user data.

20. A computer program product comprising a non-transitory computer-readable storage medium bearing computer program code embodied therein for use with a computer, the computer program code comprising code for performing:
receiving information on reference signal resource allocation;
transmitting a reference signal using the informed reference signal resource allocation;
receiving information on resources allocated for user data transmission, wherein minimum scheduling units in frequency and time do not comprise reference signals; and
transmitting user data using the informed resources allocated for user data transmission, wherein the reference signal is a sounding reference signal.

\* \* \* \* \*